United States Patent
He

(10) Patent No.: US 12,250,733 B2
(45) Date of Patent: Mar. 11, 2025

(54) RANDOM ACCESS METHOD AND DEVICE, AND TERMINAL

(71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 307 days.

(21) Appl. No.: 17/578,261

(22) Filed: Jan. 18, 2022

(65) Prior Publication Data

US 2022/0141888 A1 May 5, 2022

Related U.S. Application Data

(63) Continuation of application No. PCT/CN2019/097792, filed on Jul. 25, 2019.

(51) Int. Cl.
*H04W 74/0833* (2024.01)
*H04L 1/08* (2006.01)
*H04W 74/00* (2009.01)

(52) U.S. Cl.
CPC ........... *H04W 74/0841* (2013.01); *H04L 1/08* (2013.01); *H04W 74/002* (2013.01)

(58) Field of Classification Search
CPC .... H04W 74/0841; H04W 74/002; H04L 1/08
See application file for complete search history.

(56) References Cited

U.S. PATENT DOCUMENTS

| 2016/0212750 A1* | 7/2016 | Xu | ........................ | H04B 7/0456 |
| 2017/0272214 A1* | 9/2017 | Chen | ...................... | H04L 5/0001 |

(Continued)

FOREIGN PATENT DOCUMENTS

| CN | 102325377 A | 1/2012 |
| CN | 108811119 A | 11/2018 |

(Continued)

OTHER PUBLICATIONS

3GPP TS 38.214 V15.6.0 (Jun. 2019)—3rd Generation Partnership Project; Technical Specification Group Radio Access Network; NR; Physical layer procedures for data (Release 15) (105 pages).

(Continued)

*Primary Examiner* — Christopher M Crutchfield
*Assistant Examiner* — Tito Q Pham
(74) *Attorney, Agent, or Firm* — PERKINS COIE LLP

(57) ABSTRACT

A method and apparatus for random access and a network device are provided. The method includes: in a case that a terminal determines to retransmit a first uplink data channel in a first message, completing preparation for retransmitting the first uplink data channel within a third time interval after a first downlink data channel, the first message including a first random access channel and the first uplink data channel, wherein the first downlink data channel is used for carrying a second message, and the second message is a response message to the first message; wherein the first message is a MSG A in a two-step random access procedure, the first random access channel is a PRACH, and the first uplink data channel is a PUSCH; the first downlink data channel is a PDSCH, and the second message is a MSG B in the two-step random access procedure.

15 Claims, 12 Drawing Sheets

---

In a case of determining to retransmit a first message, a terminal completes preparation for retransmitting the first message within a first time interval after a first time window or a first downlink data channel, the first message including a first random access channel and a first uplink data channel, wherein the first time window is used for receiving first DCI corresponding to the first message, and the first DCI is used for scheduling the first downlink data channel

601

(56) References Cited

U.S. PATENT DOCUMENTS

| | | | |
|---|---|---|---|
| 2017/0272322 A1* | 9/2017 | You | H04L 41/0853 |
| 2018/0091267 A1* | 3/2018 | Kim | H04L 5/001 |
| 2018/0317264 A1 | 11/2018 | Agiwal et al. | |
| 2018/0343047 A1* | 11/2018 | He | H04L 1/1812 |
| 2018/0368188 A1* | 12/2018 | Aiba | H04W 74/0833 |
| 2022/0183071 A1* | 6/2022 | Liu | H04W 74/0833 |
| 2022/0287107 A1* | 9/2022 | Kim | H04W 72/0446 |

FOREIGN PATENT DOCUMENTS

| | | | |
|---|---|---|---|
| CN | 109845378 A | | 6/2019 |
| CN | 109892000 A | | 6/2019 |
| KR | 1020190081548 | * | 7/2019 |

OTHER PUBLICATIONS

3GPP TSG RAN WG1 #97—R1-1906125—Reno, USA, May 13-17, 2019—vivo, Discussion on 2-step RACH procedure (8 pages).

International Search Report issued Apr. 3, 2020 of PCT/CN2019/097792 (4 pages).

Extended European Search Report of the European application No. 19938471.0, issued on May 27, 2022. 12 pages.

Huawei et al. "Discussion on the MsgA transmission" R2-1907726; 3GPP TSG-RAN WG2 #106; Reno, US, May 13-17, 2019. 3 pages.

LG Electronics "Discussion on Procedure for 2-step RACH" R1-1906718; 3GPP TSG WG1 Meeting #97; Reno, USA, May 13-17, 2019. 13 pages.

Nokia et al. "Feature lead summary #3 on 2 step RACH procedures" R1-1907900; 3GPP TSG RAN WG1 #97; Reno, USA, May 13-17, 2019. 59 pages.

Panasonic "Discussion on 2-step RACH procedure" R1-1902394; 3GPP TSG RAN WG1 #96; Athens, Greece, Feb. 25-Mar. 1, 2019. 4 pages.

Decision of Rejection of the CN application No. 202111647799.X, issued on May 22, 2023. 10 pages with English translation.

First Office Action for Chinese Application No. 202111647799X issued Jan. 19, 2023. 14 pages with English translation.

Second Office Action for Chinese Application No. 202111647799X issued Mar. 17, 2023. 11 pages with English translation.

Notification of Reexamination of the Chinese application No. 202111647799.X, issued on Feb. 28, 2024. 13 pages with English translation.

Decision on Reexamination of the Chinese application No. 202111647799.X, issued on Apr. 29, 2024. 28 pages with English translation.

* cited by examiner

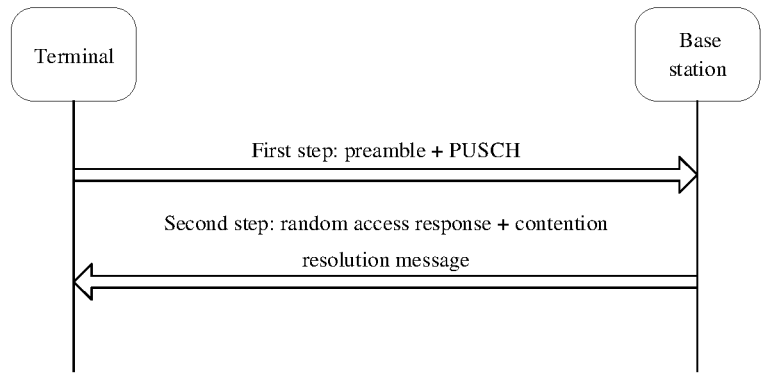

FIG. 4

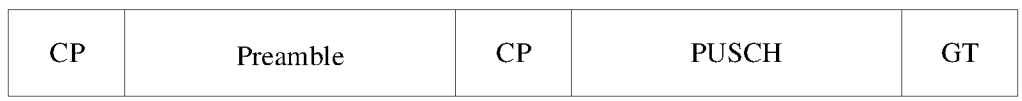

FIG. 5A

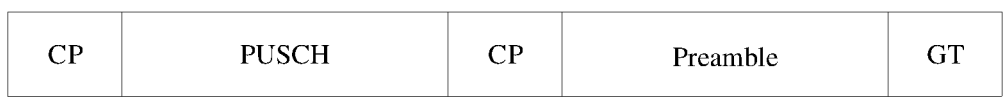

FIG. 5B

In a case of determining to retransmit a first message, a terminal completes preparation for retransmitting the first message within a first time interval after a first time window or a first downlink data channel, the first message including a first random access channel and a first uplink data channel, wherein the first time window is used for receiving first DCI corresponding to the first message, and the first DCI is used for scheduling the first downlink data channel — 601

FIG. 6

In a case of determining to retransmit a first uplink data channel in a first message, a terminal completes preparation for retransmitting the first uplink data channel within a third time interval after a first downlink data channel, the first message including a first random access channel and the first uplink data channel, wherein the first downlink data channel is used for carrying a second message, and the second message is a response message to the first message    801

FIG. 8

RANDOM ACCESS METHOD AND DEVICE, AND TERMINAL

CROSS-REFERENCE TO RELATED APPLICATION

The present application is a continuation application of the International PCT Application No. PCT/CN2019/097792, having an international filing date of Jul. 25, 2019, the entire content of which is hereby incorporated by reference.

TECHNICAL FIELD

Embodiments of the present application relate to the field of mobile communication technology, and more specifically, to a method for random access, an apparatus, and a terminal.

RELATED ART

A random access procedure in a Long Term Evolution (LTE) system uses a four-step random access procedure. The four-step random access procedure in the LTE system is still adopted in a New Radio (NR) system. With a discussion for standardization, it is considered that the four-step random access procedure is relatively complicated, which will bring relatively long delay to access of a terminal, so a two-step random access procedure is proposed. MSG1 and MSG3 in the four-step random access procedure are transmitted through MSGA in the two-step random access procedure, and MSG2 and MSG4 in the four-step random access procedure are transmitted through MSGB in the two-step random access procedure. In the two-step random access procedure, MSGA retransmission-related time has not been clear and definite, which affects efficiency of random access.

SUMMARY

Embodiments of the present application provide a method for random access, an apparatus, and a terminal.

A method for random access provided by an embodiment of the present application includes: in a case that a terminal determines to retransmit a first message, completing preparation for retransmitting the first message within a first time interval after a first time window or a first downlink data channel, the first message including a first random access channel and a first uplink data channel, wherein the first time window is used for receiving first Downlink Control Information (DCI) corresponding to the first message, and the first DCI is used for scheduling the first downlink data channel.

A method for random access provided by an embodiment of the present application includes: in a case that a terminal determines to retransmit a first uplink data channel in a first message, completing preparation for retransmitting the first uplink data channel within a third time interval after a first downlink data channel, the first message including a first random access channel and the first uplink data channel, wherein the first downlink data channel is used for carrying a second message, and the second message is a response message to the first message.

An apparatus for random access provided by an embodiment of the present application includes: a processing unit, configured to complete preparation for retransmitting a first message within a first time interval after a first time window or a first downlink data channel, in a case of determining to retransmit the first message, the first message including a first random access channel and a first uplink data channel, wherein the first time window is used for receiving first DCI corresponding to the first message, and the first DCI is used for scheduling the first downlink data channel.

An apparatus for random access provided by an embodiment of the present application includes: a processing unit, configured to complete preparation for retransmitting a first uplink data channel within a third time interval after a first downlink data channel, in a case of determining to retransmit the first uplink data channel in a first message, the first message including a first random access channel and the first uplink data channel, wherein the first downlink data channel is used for carrying a second message, and the second message is a response message to the first message.

A terminal provided by an embodiment of the present application includes a processor and a memory. The memory is configured to store a computer program, and the processor is configured to call and run the computer program stored in the memory, to execute the above method for random access described above.

A chip provided by an embodiment of the present application is configured to implement the above method for random access.

Specifically, the chip includes: a processor, configured to call and run a computer program from a memory to cause a device on which the chip is installed to perform the above method for random access.

A computer readable storage medium provided by an embodiment of the present application is configured to store a computer program that causes a computer to perform the above method for random access.

A computer program product provided by an embodiment of the present application includes computer program instructions wherein the computer program instructions cause a computer to perform the above method for random access.

A computer program provided by an embodiment of the present application, when being run on a computer, causes the computer to perform the above method for random access.

According to the above technical solution, by specifying the first time interval, it is ensured that the terminal has enough time to prepare for a retransmission of the first message (such as MSGA); and by specifying the third time interval, it is ensured that the terminal has enough time to prepare for a retransmission of the first uplink data channel in the first message (such as MSGA). In another aspect, the first time interval or the third time interval for the retransmission is optimally set, in conjunction with different cases of the retransmission, and a corresponding relationship between the first random access channel and the first uplink data channel, which improves random access performance of a system.

BRIEF DESCRIPTION OF DRAWINGS

The accompanying drawings described herein are intended to provide further understanding of the present application, and form a part of the present application. Schematic embodiments of the present application and their descriptions are intended to explain the present application, and do not constitute an improper limitation to the present application. In the accompanying drawings:

FIG. 4 is a flow chart of a two-step random access procedure according to an embodiment of the present application.

FIG. 5A is a first schematic diagram of MSGA according to an embodiment of the present application.

FIG. 5B is a second schematic diagram of MSGA according to an embodiment of the present application.

FIG. 6 is a first schematic flow chart of a method for random access according to an embodiment of the present application.

FIG. 8 is a second schematic flow chart of a method for random access according to an embodiment of the present application.

DETAILED DESCRIPTION

Technical solutions in embodiments of the present application will be described below with reference to drawings in the embodiments of the present application. It is apparent that the embodiments described are just a part of the embodiments of the present application, but not all of the embodiments of the present application. Based on the embodiments of the present application, all other embodiments achieved by a person of ordinary skills in the art without making inventive efforts all belong to the protection scope of the present application.

The technical solutions of the embodiments of the present application may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5th Generation (5G) mobile communication system, etc.

Figure 1:
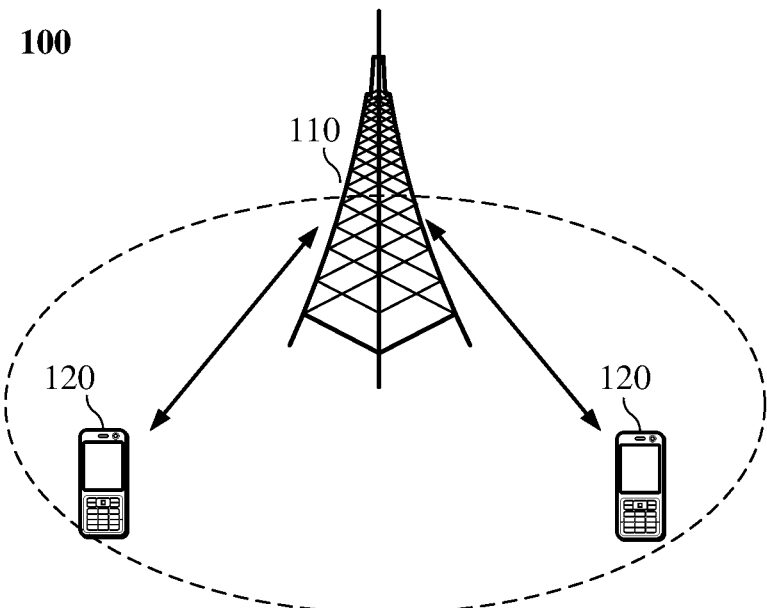
FIG. 1 is a schematic diagram of an architecture of a communication system according to an embodiment of the present application.

Illustratively, a communication system 100 applied in an embodiment of the present application is shown in FIG. 1. The communication system 100 may include a network device 110, which may be a device that communicates with terminals 120 (or referred to as communication terminals, or terminals). The network device 110 may provide communication coverage for a specific geographical area, and may communicate with terminals located within the coverage area. Optionally, the network device 110 may be a Base Transceiver Station (BTS) in a GSM system or a CDMA system, or a NodeB (NB) in a WCDMA system, or an Evolutional Node B (eNB or eNodeB) in the LTE system, or a radio controller in a Cloud Radio Access Network (CRAN). Or the network device may be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal 120 located within the coverage area of the network device 110. The "terminal" as used herein includes, but is not limited to, an apparatus configured to receive/send communication signals via a wired circuit connection, for example, via a connection of Public Switched Telephone Networks (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a DVB-H network, a satellite network, or an AM-FM broadcast sender; and/or another terminal; and/or an Internet of Things (IoT) device. A terminal configured to communicate via a wireless interface may be referred to as "a wireless communication terminal", "a wireless terminal" or "a mobile terminal". Examples of the mobile terminal include, but are not limited to, a satellite or cellular phone; a Personal Communications System (PCS) terminal which may combine a cellular radio phone with data processing, facsimile, and data communication abilities; a PDA that may include a radio phone, a pager, internet/intranet access, a Web browser, a memo pad, a calendar, and/or a Global Positioning System (GPS) receiver; and a conventional laptop and/or palmtop receiver or another electronic apparatus including a radio phone transceiver. The terminal may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal in a 5G network, or a terminal in a future evolved PLMN, etc.

Optionally, Device to Device (D2D) communication may be performed between the terminals 120.

Optionally, a 5G system or the 5G network may also be referred to as a New Radio (NR) system or an NR network.

FIG. 1 illustrates exemplarily one network device and two terminals. Optionally, the communication system 100 may include multiple network devices, and another quantity of terminals may be included within the coverage area of each network device, which is not limited in the embodiments of the present application.

Optionally, the communication system 100 may further include another network entity, such as a network controller, a mobile management entity, or the like, which is not limited in the embodiments of the present application.

It should be understood that a device with a communication function in a network/system in an embodiment of the present application may be referred to as a communication device. Taking the communication system 100 shown in FIG. 1 as an example, the communication device may include a network device 110 and terminals 120 which have communication functions, and the network device 110 and the terminals 120 may be the specific devices described above, which will not be repeated here again. The communication device may further include another device in the communication system 100, for example, another network entity, such as a network controller, a mobile management entity, or the like, which is not limited in the embodiments of the present application.

It should be understood that the terms "system" and "network" herein are often used interchangeably herein. The term "and/or" herein describes an association relation between associated objects only, indicating that there may be three relations, for example, A and/or B may indicate three cases: A alone, both A and B, and B alone. In addition, the symbol "/" herein generally indicates that there is an "or" relation between the associated objects before and after "/".

In order to facilitate understanding of the technical solutions of the embodiments of the present application, related technologies involved in the embodiments of the present application will be explained below.

Figure 2:
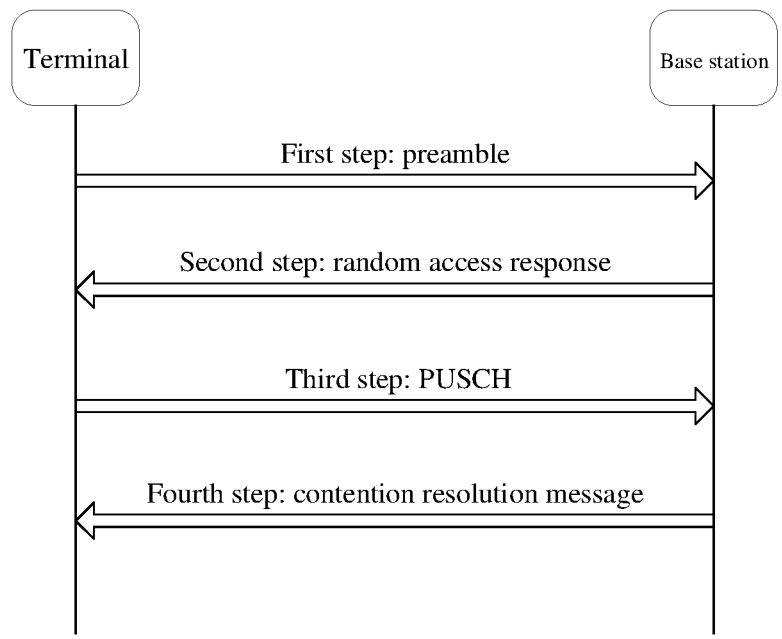
FIG. 2 is a flow chart of a four-step random access procedure according to an embodiment of the present application.

In the 5G system, for a random access procedure, a four-step random access procedure similar to LTE is used. Referring to FIG. 2, the four-step random access procedure includes the following first step to fourth step.

In the first step, a terminal sends a Physical Random Access Channel (PRACH) to a base station, the PRACH including a preamble, i.e., a message 1 (MSG1).

In the second step, after detecting that a terminal sends a preamble, the base station sends a Random Access Response (RAR), i.e., a message 2 (MSG2), to the terminal, to inform the terminal of uplink resource information that may be used for sending a message 3 (MSG3), allocate a temporary Radio Network Temporary Identifier (RNTI) to the terminal, and provide a Time Advance Command (TAC) to the terminal, etc., through the RAR.

In the third step, after receiving the RAR, the terminal sends a Physical Uplink Shared Channel (PUSCH) on an uplink resource designated by the RAR, the PUSCH being used for carrying the MSG3, wherein the MSG3 carries one piece of terminal-specific temporary identifier information.

In the fourth step, the base station sends a message 4 (MSG4) to the terminal, wherein the MSG4 includes a contention resolution message, and in addition, an uplink transmission resource is allocated to the terminal through the MSG4. When receiving the contention resolution message sent by the base station, the terminal will detect whether a terminal-specific temporary identifier carried by the terminal in the MSG3 is included in the contention resolution message sent by the base station. If yes, it is indicated that the random access procedure of the terminal is successful; otherwise, it is indicated that the random access procedure fails, and the terminal needs to initiate a random access procedure starting from the first step again.

Figure 3A:
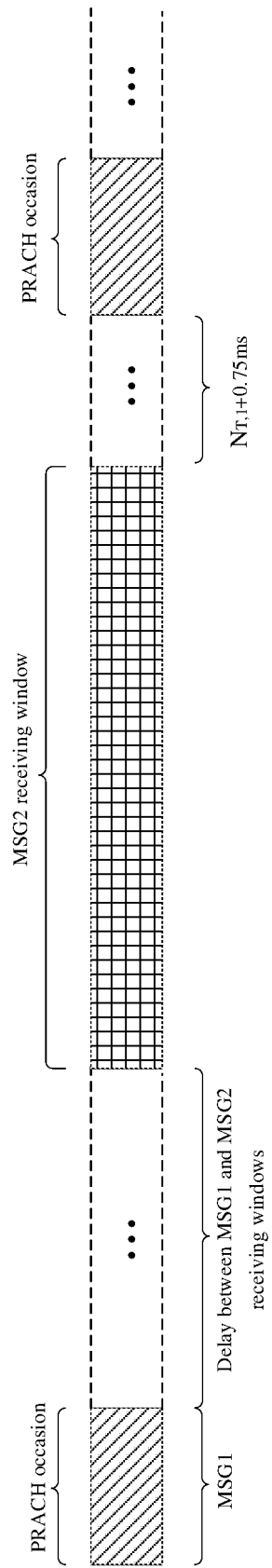
FIG. 3A is a first schematic diagram of delay according to an embodiment of the present application.

After the terminal sends the PRACH, the network indicates, through a system message, configuration information (i.e., ra-SearchSpace) of a search space for a Physical Downlink Control Channel (PDCCH) scheduling the RAR, and the terminal detects the PDCCH corresponding to the MSG1 in the search space within one RAR window, thereby receiving the RAR (i.e., the MSG2) corresponding to the MSG1. However, if the terminal does not detect a DCI format 1_0 corresponding to the MSG1 within the RAR window, that is, the DCI format 1_0 scrambled by a Random Access RNTI (RA-RNTI) is not detected, or if the terminal does not correctly receive a Physical Downlink Shared Channel (PDSCH) carrying the RAR within the RAR window, the terminal will retransmit the PRACH, and perform corresponding power ramping up. The terminal completes the preparation for sending the PRACH (i.e., the MSG1) no later than $N_{T,1}+0.75$ ms, after a last symbol of the RAR window, or after the last symbol of the PDSCH. Herein, a duration of $N_{T,1}$ is $N_1$ symbols, $N_1$ is related to the terminal's processing capability related to receiving time for the PDSCH, and retransmission delay of the MSG1 is shown in FIG. 3A.

Figure 3B:
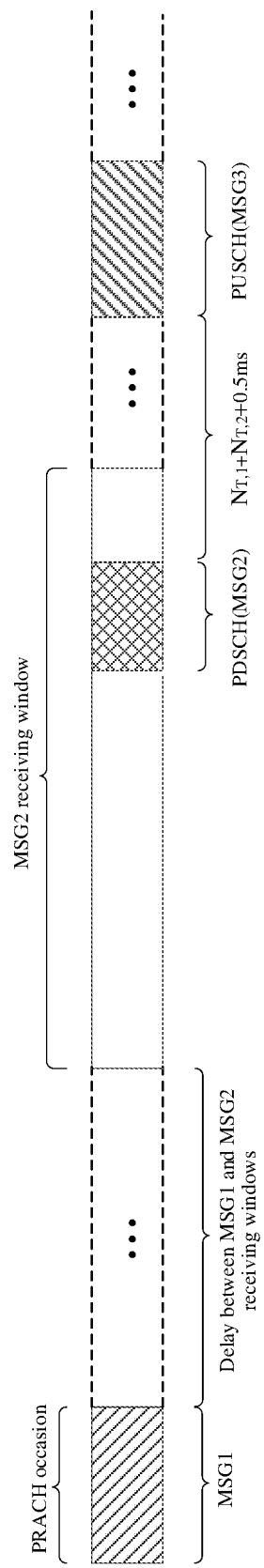
FIG. 3B is a second schematic diagram of delay according to an embodiment of the present application.

In the four-step random access procedure, a time-frequency resource of the PUSCH carrying the MSG3 is carried in the RAR. Herein, a minimum time interval between the last symbol of the PDSCH carrying the RAR, and a first symbol of the PUSCH carrying the MSG3 is $N_{T,2}+N_{T,2}+0.5$ ms, wherein the duration of $N_{T2}$ is $N_2$ symbols, and $N_2$ is related to the terminal's processing capability related to preparation time for the PUSCH. Minimum time delay between the PUSCH carrying the MSG3, and the PDSCH carrying the RAR is shown in FIG. 3B.

Figure 3C:
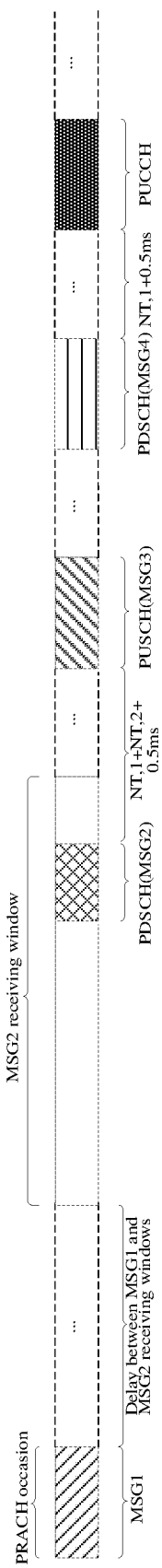
FIG. 3C is a third schematic diagram of delay according to an embodiment of the present application.

After receiving the PDSCH carrying the MSG4, the terminal feeds back Hybrid Automatic Repeat request-Acknowledgement (HARQ-ACK) information through a Physical Uplink Control Channel (PUCCH). A minimum time interval between the last symbol of the PDSCH carrying the MSG4, and the first symbol of the PUCCH carrying the HARQ-ACK information is $N_{T,1}+0.5$ ms Minimum time delay between the PDSCH carrying the MSG4 and the PUCCH corresponding to the PDSCH is shown in FIG. 3C.

In NR, processing time of the PDSCH and the preparation time of the PUSCH by the terminal are specified, as shown in Table 1 to Table 4, wherein the Table 1 and the Table 2 show a definition of the processing time (or saying decoding time, or receiving time) of the PDSCH, and the Table 3 and the Table 4 show a definition of the preparation time of the PUSCH. Herein, $\mu=0, 1, 2, 3$ respectively indicate that subcarrier spacing of the PDSCH or the PUSCH is 15 KHz, 30 KHz, 60 KHz, and 120 KHz.

TABLE 1

PDSCH processing time (PDSCH processing capacity 1)

PDSCH processing time $N_1$ [symbol]

| μ | dmrs-AdditionalPosition = pos0 in DMRS-DownlinkConfig in either of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB |
|---|---|---|
| 0 | 8 | 13 |
| 1 | 10 | 13 |
| 2 | 17 | 20 |
| 3 | 20 | 24 |

TABLE 2

PDSCH processing time (PDSCH processing capacity 2)

PDSCH processing time $N_1$ [symbol]

| μ | dmrs-AdditionalPosition = pos0 in DMRS-DownlinkConfig in either of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB |
|---|---|---|
| 0 | 3 | 13 |
| 1 | 4.5 | 13 |
| 2 | 9 (for FR1) | 20 |

TABLE 3

PUSCH preparation time (PUSCH timing capability 1)

| μ | PUSCH preparation time $N_2$ [symbol] |
|---|---|
| 0 | 10 |
| 1 | 12 |
| 2 | 23 |
| 3 | 36 |

TABLE 4

PUSCH preparation time (PUSCH timing capability 2)

| μ | PUSCH preparation time $N_2$ [symbol] |
|---|---|
| 0 | 5 |
| 1 | 5.5 |
| 2 | 11 (for FR1) |

Delay overhead of the four-step random access procedure is relatively large, which is not suitable for a low-delay and high-reliability scenario in 5G. In a standardization process of the NR, considering a characteristic of a low-delay and high-reliability related service, a solution of a two-step random access procedure is proposed, which may reduce access delay compared with the four-step random access procedure. Referring to FIG. 4, the two-step random access procedure includes the following first and second steps.

In the first step, a terminal device sends a preamble and a PUSCH (i.e., MSGA) to a base station.

Here, the PUSCH carries uplink data, such as specific temporary identifier information of the terminal.

In the second step, after detecting that there is a terminal that sends the PUSCH, the base station sends a random access response and a contention resolution message (i.e., MSGB) to the terminal.

In the two-step random access procedure, it is equivalent to combining the first step and the third step of the four-step random access procedure into the first step of the two-step random access procedure, and combining the second step and the fourth step of the four-step random access procedure into the second step of the two-step random access procedure. For the first step in the two-step random access procedure, the MSGA includes the preamble and the PUSCH, and the MSGB includes a PDCCH (carrying a random access response) and the PDSCH (carrying a contention resolution message). For the MSGA, the terminal needs to send the preamble and the PUSCH, as shown in FIG. 5A and FIG. 5B, wherein there is a corresponding relationship between a PRACH occasion where the preamble is located and a PUSCH occasion where the PUSCH is located. The corresponding relationship may be pre-defined, or indicated by the network. A precedence relationship in time between the PRACH occasion and the PUSCH occasion may be that the PRACH occasion is in front, or the PUSCH occasion is in front.

After sending the MSGA, the terminal needs to monitor the MSGB within one time window. Similarly, the MSGA may not be successfully received by the base station. If the terminal does not receive the MSGB within the time window, it will retransmit the MSGA. According to different cases of detection of the MSGA by the base station, there are the following cases regarding retransmission of MSGA: —if a PRACH in the MSGA is not detected, the MSGA may be retransmitted; —if the PRACH in the MSGA is detected, but the PUSCH in the MSGA is not decoded correctly, the MSGA, or the PUSCH in the MSGA may be retransmitted; and —if a quantity of retransmissions of the MSGA reaches a maximum quantity of times, the MSG1 in the four-step random access procedure is transmitted.

For the retransmission of the MSGA in the two-step random access procedure, since the retransmission of the MSGA includes various cases, which have different requirements for the processing capacity of the terminal, it needs to be considered that a corresponding minimum time interval requirement is defined for each case. For example, in the case of retransmitting the MSGA, the preparation time of the PUSCH of the terminal needs to be considered, while the four-step random access procedure only has a retransmission of the PRACH, the preparation time of the PUSCH does not need to be considered. If the processing time is not considered, it will be caused that the terminal cannot complete the preparation for the retransmission of the MSGA within a currently defined minimum time interval, and that processing capacity of the terminal cannot meet a requirement defined by the standard. Therefore, the following technical solution of embodiments of the present application is proposed.

FIG. 6 is a first schematic flow chart of a method for random access according to an embodiment of the present application. As shown in FIG. 6, the method for random access includes the following act 601.

In the act 601, in a case that a terminal determines to retransmit a first message, it completes preparation for retransmitting the first message within a first time interval after a first time window or a first downlink data channel, the first message including a first random access channel and a first uplink data channel, wherein the first time window is used for receiving first DCI corresponding to the first message, and the first DCI is used for scheduling the first downlink data channel.

In an optional embodiment of the present application, the first message is MSGA in the two-step random access procedure. The first message includes the first random access channel and the first uplink data channel. Herein, the first random access channel is, for example, a PRACH, and the first uplink data channel is, for example, a PUSCH.

In an optional embodiment of the present application, the first downlink data channel is, for example, a PDSCH, and used for carrying a second message, and the second message is a response message to the first message, for example, the second message is MSGB in the two-step random access procedure.

In an optional embodiment of the present application, the first time window is used for receiving the first DCI corresponding to the first message, and the first DCI is used for scheduling the first downlink data channel. In an example, the first time window is called a MSGB receiving window, the MSGB receiving window is used for transmitting the first DCI corresponding to the MSGA, and the first DCI is used for scheduling the PDSCH. For the terminal, the terminal detects the first DCI corresponding to the MSGA in the MSGB receiving window. If the first DCI corresponding to the MSGA is detected, the terminal further receives the MSGB on the PDSCH scheduled by the first DCI.

In an embodiment of the present application, the terminal determines, through the following modes, that the first message needs to be retransmitted: in a first mode, the terminal determines to retransmit the first message, in a case that it does not detect the first DCI corresponding to the first message in the first time window; or in a second mode, the terminal determines to retransmit the first message, when it detects the first DCI corresponding to the first message in the first time window, and does not receive a second message on the first downlink data channel scheduled by the first DCI, the second message being a response message to the first message.

For example, if the terminal does not detect the first DCI corresponding to the MSGA in the MSGB receiving window, or detects the first DCI corresponding to the MSGA in the MSGB receiving window, but does not receive the corresponding MSGB on the PDSCH scheduled by the first DCI, it is determined that the MSGA needs to be retransmitted.

In an optional embodiment of the present application, in a case that the terminal determines to retransmit the first message, it completes the preparation for retransmitting the first message within the first time interval after the last symbol of the first time window or the last symbol of the first downlink data channel. For example, if the terminal determines to retransmit the MSGA, the terminal completes the preparation for retransmitting the MSGA within the first time interval after the last symbol of the MSGB receiving window or the last symbol of the PDSCH.

Considering that the first message (e.g., the MSGA) includes the first random access channel (e.g., the PRACH) and the first uplink data channel (e.g., the PUSCH), if the terminal needs to retransmit the first message, it needs more processing time to prepare the first message. The first time interval is specified below in conjunction with different implementation solutions.

First Solution

The first time interval includes first time, the first time being the preparation time of the terminal for the first uplink data channel.

For example, the first time interval includes the preparation time $N_{T,2}$ of the terminal for the PUSCH, wherein the duration of $N_{T,2}$ is $N_2$ symbols, and $N_2$ is related to the terminal's processing capability related to the preparation time for the PUSCH.

Further, optionally, the first time interval also includes second time, the second time being the processing time of the terminal for the first downlink data channel.

For example, the first time interval includes not only the preparation time $N_{T,2}$ of the terminal for the PUSCH, but also the processing time $N_{T,1}$ for the PDSCH. The processing time for the PDSCH refers to the processing time of the terminal for receiving the PDSCH within the MSGB receiving window, so as to determine whether there is MSGB sent to itself. Herein, the duration of $N_{T,1}$ is $N_1$ symbols, and $N_1$ is related to the UE's processing capability related to the processing time for the PDSCH.

Further, optionally, the first time interval also includes a first fixed time length.

For example, referring to the retransmission of the MSG1 in the four-step random access procedure, the first fixed time length may be 0.75 ms. Of course, the value of the first fixed time length is not limited to this, and another time length may also be possible.

Based on this, preferably, the first time interval includes the first time, the second time, and the first fixed time length. For example, the first time interval is $N_{T,1}+N_{T,2}+0.75$ ms.

For the base station, there are many cases of the results of detecting the MSGA by the base station. For example, the base station only detects the PRACH, or detects the PRACH and the PUSCH, or even only detects the PUSCH. The base station may respond in the MSGB receiving window of the terminal, e.g., respond to the PRACH, respond to the MSGA, etc., wherein a response message is carried in the PDSCH. In this case, the terminal completes the preparation for retransmitting the MSGA within the first time interval after the last symbol of the PDSCH, wherein the PDSCH received by the terminal is the PDSCH carrying the MSGB.

Figure 7A:
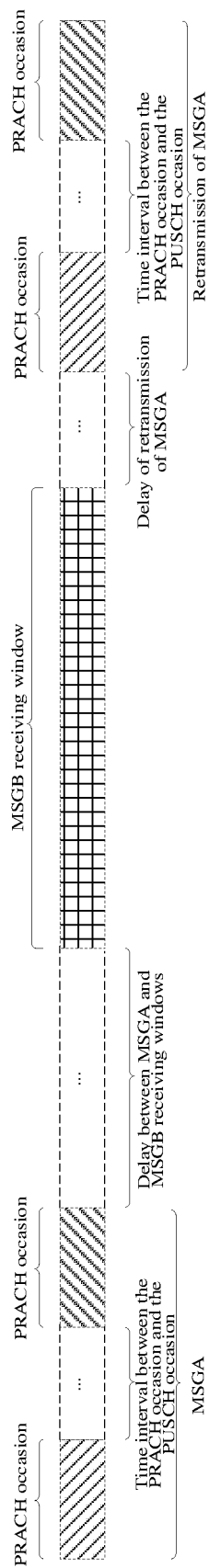
FIG. 7A is a fourth schematic diagram of delay according to an embodiment of the present application.

Specifically, in the two-step random access procedure, the terminal sends the MSGA, and detects DCI scheduling MSGB in the MSGB receiving window. If the terminal does not detect the DCI scheduling the MSGB in the MSGB receiving window, or detects the DCI scheduling the MSGB, but does not successfully receive the MSGB, it determines to retransmit the MSGA. The terminal completes the preparation for retransmitting the MSGA within the first time interval after the last symbol of the MSGB receiving window or the last symbol of the PDSCH (which carries the MSGB). As shown in FIG. 7A, the delay of retransmitting the MSGA is the first time interval, wherein the first time interval needs to consider the preparation time of the terminal for the PUSCH.

In the first solution, the first time interval includes the preparation time of the PUSCH in the MSGA. In the preparation for retransmitting the MSGA, enough processing time is reserved for the terminal, so that the terminal may complete the preparation for the MSGA within the defined first time interval.

Second Solution

The first time interval is determined based on a corresponding relationship between a first transmission occasion and a second transmission occasion. The first transmission occasion is used for transmitting the first random access channel in the first message, and the second transmission occasion is used for transmitting the first uplink data channel in the first message.

Here, there is a corresponding relationship between the first random access channel and the first uplink data channel in the first message, so there is a corresponding relationship between the first transmission occasion for transmitting the first random access channel and the second transmission occasion for transmitting the first uplink data channel. For example, there is a corresponding relationship between a PRACH occasion for sending the PRACH and the PUSCH occasion for sending the PUSCH in the MSGA. The first time interval is related to the corresponding relationship between the first transmission occasion and the second transmission occasion.

Since there is a corresponding relationship between the first transmission occasion (e.g., the PRACH occasion) and the second transmission occasion (e.g., the PUSCH occasion), there is usually a time interval between the first transmission occasion and the second transmission occasion, i.e., there is a second time interval between the first transmission occasion and the second transmission occasion. The second time interval is, for example, Guard Time (GT), or a Cyclic Prefix (CP), etc. The first transmission occasion and the second transmission occasion are even located in different time slots. Since different corresponding relationships between the first transmission occasion and the second transmission occasion may be configured, the second time interval between them may be different.

Since it needs to be ensured that a certain time interval (i.e., the first time interval) meets the processing time of the terminal in order to retransmit the first message, the first time interval defined in the present embodiment is related to the corresponding relationship between the first transmission occasion and the second transmission occasion, and the first time interval may be determined according to a certain preset rule. Next, the first time interval is specified in conjunction with different cases of the second time interval respectively.

1) In a case that the second time interval is smaller than, or is smaller than or equal to, a first threshold, the first time interval includes first time, the first time being the preparation time of the terminal for the first uplink data channel.

For example, if the second time interval between the PRACH occasion and the PUSCH occasion is smaller than, or is smaller than or equal to, the first threshold, the second time interval between them cannot be used for the preparation time of the terminal for the PUSCH. In this case, the first time interval needs to include the preparation time $N_{T,2}$ of the terminal for the PUSCH.

Further, optionally, the first time interval also includes second time, the second time being receiving the processing time of the terminal for the first downlink data channel.

For example, the first time interval includes not only the preparation time $N_{T,2}$ of the terminal for the PUSCH, but also the processing time $N_{T,1}$ for the PDSCH. The processing time for the PDSCH refers to the processing time of the terminal for receiving the PDSCH within the MSGB receiving window, so as to determine whether there is the MSGB sent to itself. Herein, the duration of $N_{T,1}$ is $N_1$ symbols, and $N_1$ is related to the UE's processing capability related to the processing time for the PDSCH.

Further, optionally, the first time interval also includes a first fixed time length.

For example, referring to the retransmission of the MSG1 in the four-step random access procedure, the first fixed time length may be 0.75 ms. Of course, the value of the first fixed time length is not limited to this, and another time length may also be possible.

Based on this, preferably, the first time interval includes the first time, the second time, and the first fixed time length. For example, the first time interval is $N_{T,1}+N_{T,2}+0.75$ ms.

2) In a case that the second time interval is greater than, or is greater than or equal to, the first threshold, the first time interval includes second time, the second time being receiving time of the terminal for the first downlink data channel.

For example, if the second time interval between the PRACH occasion and the PUSCH occasion is greater than, or is greater than or equal to, the first threshold, the second time interval between them may be used for the preparation time of the terminal for the PUSCH. In this case, the first time interval may not include the preparation time $N_{T,2}$ of the terminal for the PUSCH. Further, the first time interval includes the processing time $N_{T,1}$ of the PDSCH. The processing time for the PDSCH refers to the processing time of the terminal for receiving the PDSCH within the MSGB receiving window, so as to determine whether there is the MSGB sent to itself. Herein, the duration of $N_{T,1}$ is $N_1$ symbols, and $N_1$ is related to the UE's processing capability related to the processing time for the PDSCH.

Further, optionally, the first time interval also includes a first fixed time length.

For example, referring to the retransmission of the MSG1 in the four-step random access procedure, the first fixed time length may be 0.75 ms. Of course, the value of the first fixed time length is not limited to this, and another time length may also be possible.

Based on this, preferably, the first time interval includes the second time and the first fixed time length. For example, the first time interval is $N_{T,1}+0.75$ ms.

The above first threshold may be predefined, or indicated by the network, e.g., indicated by the network through a system message or configuration information. In an example, the value of the first threshold is equal to the preparation time $N_{T,2}$ of the terminal for the PUSCH.

3) A sum of the first time interval and the second time interval is greater than, or is greater than or equal to a sum of the first time, the second time, and the first fixed time length, wherein the first time is the preparation time of the terminal for the first uplink data channel, and the second time is the processing time of the terminal for the first downlink data channel.

Further, optionally, the first time interval is greater than, or is greater than or equal to, a sum of the second time and the first fixed time length.

For example, a sum of the first time interval, and the second time interval between the PRACH occasion and the PUSCH occasion needs to be greater than, or needs to be greater than or equal to, $N_{T,1}+N_{T,2}+0.75$ ms, and the first time interval needs to be greater than, or needs to be greater than or equal to, $N_{T,1}+0.75$ ms. In this case, the terminal can complete the preparation for the transmission of the PRACH, and can partially prepare for the transmission of the PUSCH, during the first time interval. And preparation for the transmission of the PUSCH is continued till completion, during the second time interval between the PRACH occasion and the PUSCH occasion. Therefore, the terminal completes the preparation for the transmissions of the PRACH and the PUSCH jointly, within the above two time intervals.

Figure 7B:
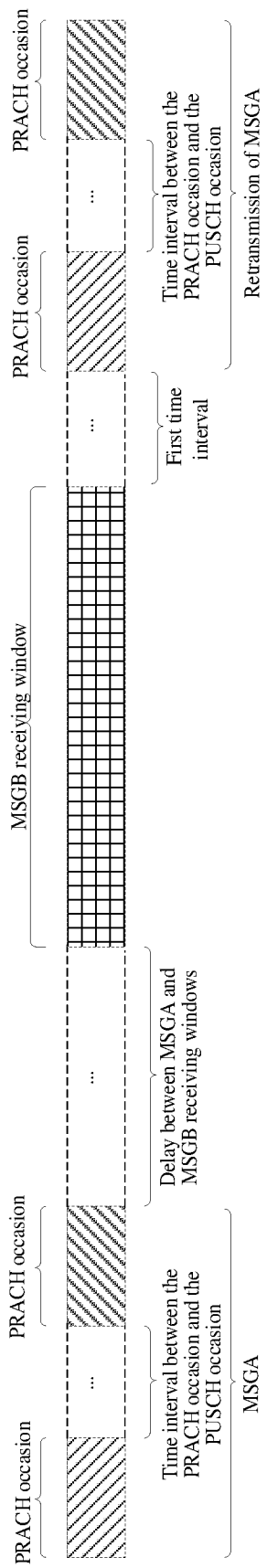
FIG. 7B is a fifth schematic diagram of delay according to an embodiment of the present application.

Specifically into the two-step random access procedure, the terminal sends the MSGA, and detects the DCI scheduling the MSGB in the MSGB receiving window. If the terminal does not detect the DCI scheduling the MSGB in the MSGB receiving window, or detects the DCI scheduling the MSGB, but does not successfully receive the MSGB, it determines to retransmit the MSGA. The terminal determines a corresponding relationship between the PRACH occasion and the PUSCH occasion, and determines the first time interval according to the corresponding relationship. The terminal completes the preparation for retransmitting the MSGA within the first time interval after the last symbol of the MSGB receiving window or the last symbol of the PDSCH. As shown in FIG. 7B, an association relationship of the first time interval, and the second time interval between the PRACH occasion and the PUSCH occasion exists.

In the second solution, the first time interval does not include all the preparation time of the MSGA, and may include only a part of it. The second time interval between the PRACH occasion and the PUSCH occasion may be taken as part of the preparation time of the MSGA. Therefore, there is an association relationship of the first time interval, and the second time interval between the PRACH occasion and the PUSCH occasion. By considering the first time interval, and the second time interval between the PRACH occasion and the PUSCH occasion as a whole, the first time interval may be further shortened, fully utilizing the second time interval between the PRACH occasion and the PUSCH occasion for the preparation time of the UE, thereby reducing delay of an MSGA retransmission.

In an embodiment, the above-mentioned first time interval in an embodiment of the present application may be defined.

In another embodiment, the above-mentioned first time interval in an embodiment of the present application may be indicated to the terminal by a network device, or information of a part of time in the first time interval may be indicated to the terminal by the network device. Here, the network device may be a base station. The base station may flexibly configure and indicate the first time interval according to a specific case, so that the base station may flexibly control delay of random access, and optimally configure the first time interval according to a specific case of a processing capacity of the terminal and the retransmission, improving random access performance of the system.

For example, in conjunction with the second solution, the first time interval includes the receiving time $N_{T,1}$ of the PDSCH and a target time interval indicated by the network device. Since the network device configures the PRACH occasion and the PUSCH occasion, and the corresponding relationship between them, the network device is clear about the second time interval between the PRACH occasion and the PUSCH occasion, and the processing time required by the terminal. Thus, the network device may indicate, according to these pieces of information, the target time interval for determining the first time interval. Optionally, the network device may also directly indicate the first time interval.

FIG. 8 is a second schematic flow chart of a method for random access according to an embodiment of the present application. As shown in FIG. 8, the method for random access includes the following act 801.

In the act 801, in a case that a terminal determines to retransmit a first uplink data channel in a first message, it completes preparation for retransmitting the first uplink data channel within a third time interval after a first downlink data channel, the first message including a first random access channel and the first uplink data channel, wherein the first downlink data channel is used for carrying a second message, and the second message is a response message to the first message.

In an optional embodiment of the present application, the first message is MSGA in the two-step random access procedure. The first message includes the first random access channel and the first uplink data channel, wherein the first random access channel is, for example, a PRACH, and the first uplink data channel is, for example, a PUSCH.

In an optional embodiment of the present application, the first downlink data channel is, for example, a PDSCH, and used for carrying a second message, and the second message is the response message to the first message, for example, the second message is MSGB in the two-step random access procedure.

In an embodiment of the present application, the terminal determines, through the following mode, that the first message needs to be retransmitted.

The terminal detects first DCI within a first time window, the first DCI is used for scheduling the first downlink data channel, the first downlink data channel includes first indication information, wherein the first indication information is used for indicating that a base station successfully receives the first random access channel but does not successfully receive the first uplink data channel; and the terminal determines to retransmit the first uplink data channel in the first message based on the first indication information. Further, the not successfully receiving the first uplink data channel includes: not detecting, by the base station, the first uplink data channel; or detecting, by the base station, the first uplink data channel, but failing to decode the first uplink data channel.

In an example, the first time window is called a MSGB receiving window, and the MSGB receiving window is used for transmitting the first DCI corresponding to the MSGA, and the first DCI is used for scheduling the PDSCH. For the terminal, the terminal detects the first DCI corresponding to the MSGA in the MSGB receiving window. If the first DCI corresponding to the MSGA is detected, the terminal further receives the first indication information on the PDSCH scheduled by the first DCI, and the terminal determines to retransmit the PUSCH in the MSGA based on the first indication information. Here, the first indication information is used for indicating that the PRACH in the MSGA is detected by the base station, but the PUSCH in the MSGA is not detected or fails to be decoded.

In an optional embodiment of the present application, in a case that the terminal determines to retransmit the first uplink data channel in the first message, it completes the preparation for retransmitting the first uplink data channel within a third time interval after the last symbol of the first downlink data channel.

Considering that the first uplink data channel (e.g., the PUSCH) needs to be retransmitted and the first random access channel (e.g., the PRACH) does not need to be retransmitted, the third time interval needs to be defined, to meet a corresponding processing time requirement of the terminal. A specific implementation of the third time interval will be described below.

The third time interval includes first time, the first time being preparation time of the terminal for the first uplink data channel.

For example, the third time interval includes the preparation time $N_{T,2}$ of the terminal for the PUSCH, wherein a duration of $N_{T,2}$ is $N_2$ symbols, and $N_2$ is related to the terminal's processing capability related to the preparation time for the PUSCH.

Further, optionally, the third time interval also includes second time, the second time being the processing time of the terminal for the first downlink data channel.

For example, the third time interval includes not only the preparation time $N_{T,2}$ of the terminal for the PUSCH, but also the processing time $N_{T,1}$ for the PDSCH. The processing time for the PDSCH refers to the processing time of the terminal for receiving the PDSCH within the MSGB receiving window, so as to determine whether there is the MSGB sent to itself. Herein, the duration of $N_{T,1}$ is $N_1$ symbols, and $N_1$ is related to the UE's processing capability related to the processing time for the PDSCH.

Further, optionally, the third time interval also includes a second fixed time length.

Here, since the PRACH is not involved in the retransmission, a corresponding second fixed time length may be appropriately reduced compared with the first fixed time length in the aforementioned solution. For example, referring to the transmission of the MSG3 in the four-step random access procedure, the second fixed time length may be 0.5 ms. Of course, a value of the second fixed time length is not limited to this, and another time length may also be possible.

Based on this, preferably, the third time interval includes the first time, the second time, and the second fixed time length. For example, the third time interval is $N_{T,1}+N_{T,2}+0.5$ ms.

For the base station, there are many cases of a result of the base station detecting the MSGA. For example, the base station has only detected the PRACH, or detects the PRACH and the PUSCH, or even only detects the PUSCH. The base station may respond in the MSGB receiving window of the terminal, e.g., respond to the PRACH, respond to the MSGA, etc., wherein a response message is carried in the PDSCH. In this case, the terminal completes the preparation for retransmitting the PUSCH in the MSGA within a third time interval after the last symbol of the PDSCH, wherein the PDSCH received by the terminal is a PDSCH carrying the MSGB.

It should be noted that the above first indication information is carried in the PDSCH, and the technical solution of the present embodiment is not limited to this, and the first indication information may also be carried in the first DCI for scheduling the PDSCH.

Figure 9:
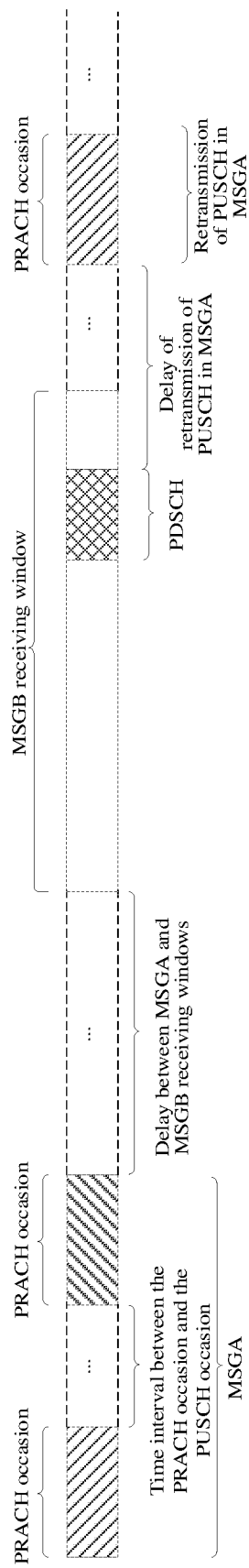
FIG. 9 is a sixth schematic diagram of delay according to an embodiment of the present application.

Specifically, in the two-step random access procedure, the terminal sends the MSGA, and detects the DCI scheduling the MSGB in the MSGB receiving window. If the terminal receives the first indication information in the MSGB receiving window, it determines to retransmit the PUSCH in the MSGA. The terminal completes the preparation for retransmitting the PUSCH in the MSGA in the third time interval after the last symbol of the PDSCH (which carries the first indication information, and/or the MSGB). As shown in FIG. 9, delay of a retransmission of the PUSCH in the MSGA is the third time interval, wherein the third time interval needs to consider the preparation time of the terminal for the PUSCH.

In an embodiment, the above third time interval of the embodiment of the present application may be defined.

In another embodiment, the above-mentioned third time interval in the embodiment of the present application may be indicated to the terminal by a network device, or information of a part of time in the third time interval may be indicated to the terminal by the network device. The base station may flexibly configure and indicate the third time interval according to a specific case, so that the base station may flexibly control the delay of the random access, and optimally configure the third time interval according to a specific processing capacity of the terminal and a retransmission case, improving random access performance of the system.

Figure 10:
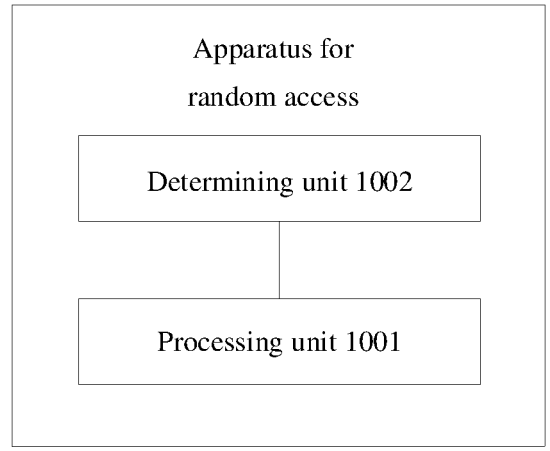
FIG. 10 is a first schematic diagram of structural composition of an apparatus for random access according to an embodiment of the present application.

FIG. 10 is a first schematic structural composition diagram of an apparatus for random access according to an embodiment of the present application. As shown in FIG. 10, the apparatus for random access includes a processing unit 1001.

The processing unit 1001 is configured to complete preparation for retransmitting a first message within a first time interval after a first time window or a first downlink data channel, in a case of determining to retransmit the first message, the first message including a first random access channel and a first uplink data channel, wherein, the first time window is used for receiving first DCI corresponding to the first message, and the first DCI is used for scheduling the first downlink data channel.

In an optional embodiment, the first time interval includes first time, the first time being preparation time of the terminal for the first uplink data channel.

In an optional embodiment, the first time interval also includes second time, the second time being processing time of the terminal for the first downlink data channel.

In an optional embodiment, the first time interval also includes a first fixed time length.

In an optional embodiment, the first time interval is determined based on a corresponding relationship between a first transmission occasion and a second transmission occasion. The first transmission occasion is used for transmitting the first random access channel in the first message, and the second transmission occasion is used for transmitting the first uplink data channel in the first message.

In an optional embodiment, there is a second time interval between the first transmission occasion and the second transmission occasion; when the second time interval is smaller than, or is smaller than or equal to, a first threshold, the first time interval includes the first time, the first time being the preparation time of the terminal for the first uplink data channel.

In an optional embodiment, the first time interval also includes the second time, the second time being the processing time of the terminal for the first downlink data channel.

In an optional embodiment, the first time interval also includes the first fixed time length.

In an optional embodiment, there is a second time interval between the first transmission occasion and the second transmission occasion; in a case that the second time interval is greater than, or is greater than or equal to, the first threshold, the first time interval includes the second time, the second time being receiving time of the terminal for the first downlink data channel.

In an optional embodiment, the first time interval further includes the first fixed time length.

In an optional embodiment, there is the second time interval between the first transmission occasion and the second transmission occasion; a sum of the first time interval and the second time interval is greater than, or is greater than or equal to, a sum of the first time, the second time, and the first fixed time length, wherein, the first time is the preparation time of the terminal for the first uplink data channel, and the second time is the processing time of the terminal for the first downlink data channel.

In an optional embodiment, the first time interval is greater than, or is greater than or equal to, a sum of the second time and the first fixed time length.

In an optional embodiment, the first time interval is indicated to the terminal by a network device; or, information of a part of time in the first time interval is indicated to the terminal by the network device.

In an optional embodiment, the processing unit 1001 is configured to complete the preparation for retransmitting the first message within the first time interval after the last symbol of the first time window or the last symbol of the first downlink data channel.

In an optional embodiment, the apparatus further includes a determining unit 1002.

The determining unit 1002 is configured to determine to retransmit the first message, in a case that the first DCI corresponding to the first message is not detected in the first time window; or determine to retransmit the first message, in a case that the first DCI corresponding to the first message is detected in the first time window and a second message is not received on the first downlink data channel scheduled by the first DCI, the second message being a response message to the first message.

In an optional embodiment, the first downlink data channel is used for carrying the second message, wherein the second message is the response message to the first message.

Those skilled in the art should understand that the related description for the above apparatus for random access in the embodiment of the present application may be understood with reference to the related description for the method for random access in the embodiment of the present application.

Figure 11:
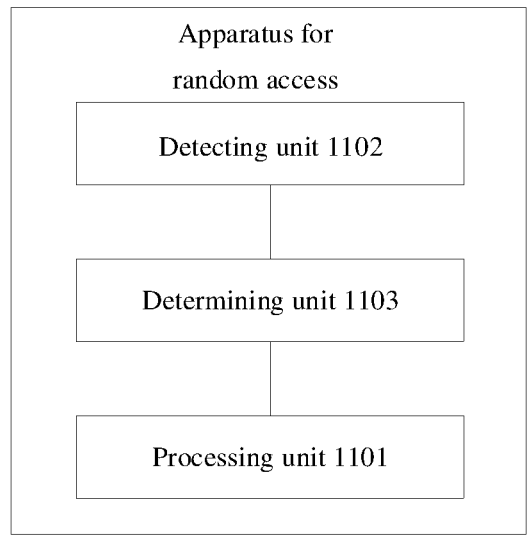
FIG. 11 is a second schematic diagram of structural composition of an apparatus for random access according to an embodiment of the present application.

FIG. 11 is a second schematic structural composition diagram of an apparatus for random access according to an embodiment of the present application. As shown in FIG. 11, the apparatus for random access includes a processing unit 1101.

The processing unit 1101 is configured to complete preparation for retransmitting a first uplink data channel within a third time interval after a first downlink data channel, in a case of determining to retransmit the first uplink data channel in a first message, the first message including a first random access channel and the first uplink data channel, wherein, the first downlink data channel is used for carrying a second message, the second message being a response message to the first message.

In an optional embodiment, the third time interval includes first time, the first time being preparation time of the terminal for the first uplink data channel.

In an optional embodiment, the third time interval further includes second time, the second time being processing time of the terminal for the first downlink data channel.

In an optional embodiment, the third time interval further includes a second fixed time length.

In an optional embodiment, the processing unit is configured to complete the preparation for retransmitting the first uplink data channel within the third time interval after a last symbol of the first downlink data channel.

In an optional embodiment, the third time interval is indicated to the terminal by a network device; or, information of a part of time in the third time interval is indicated to the terminal by the network device.

In an optional implementation, the apparatus further includes: a detecting unit 1102 and a determining unit 1103.

The detecting unit 1102 is configured to detect first DCI within a first time window, wherein the first DCI is used for scheduling the first downlink data channel, the first downlink data channel includes first indication information, and the first indication information is used for indicating that a base station successfully receives the first random access channel and does not successfully receive the first uplink data channel.

The determining unit 1103 is configured to determine to retransmit the first uplink data channel in the first message based on the first indication information.

In an optional embodiment, the not successfully receiving the first uplink data channel includes: not detecting the first uplink data channel; or, detecting the first uplink data channel but failing to decode the first uplink data channel.

Those skilled in the art should understand that the related description for the above apparatus for random access in the embodiment of the present application may be understood with reference to the related description for the method for random access in the embodiment of the present application.

Figure 12:
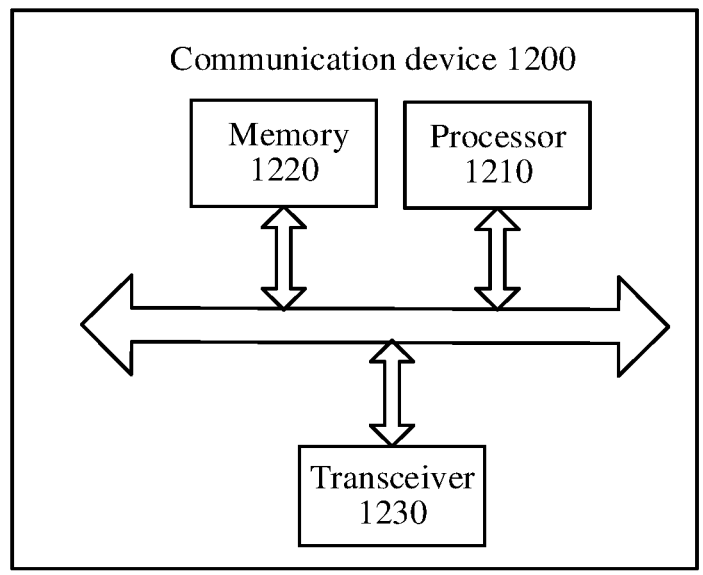
FIG. 12 is a schematic structural diagram of a communication device according to an embodiment of the present application.

FIG. 12 is a schematic structural diagram of a communication device 1200 according to an embodiment of the present application. The communication device may be a terminal or a network device. The communication device 1200 shown in FIG. 12 includes a processor 1210, wherein the processor 1210 may call and run a computer program from a memory to implement the methods in the embodiments of the present application.

Optionally, as shown in FIG. 12, the communication device 1200 may further include a memory 1220. Herein, the processor 1210 may call and run a computer program from the memory 1220 to implement the methods in the embodiments of the present application.

Herein, the memory 1220 may be a separate device independent of the processor 1210, or may be integrated in the processor 1210.

Optionally, as shown in FIG. 12, the communication device 1200 may further include a transceiver 1230, and the processor 1210 may control the transceiver 1230 to communicate with another device. Specifically, information or data may be sent to another device, or information or data sent by another device may be received.

Herein, the transceiver 1230 may include a transmitter and a receiver. The transceiver 1230 may also further include antennas, wherein a quantity of antennas may be one or more.

Optionally, the communication device 1200 may specifically be the network device in the embodiments of the present application, and the communication device 1200 may implement the corresponding processes implemented by the network device in various methods in the embodiments of the present application, which will not be repeated here again for brevity.

Optionally, the communication device 1200 may specifically be the mobile terminal/terminal in the embodiments of the present application, and the communication device 1200 may implement the corresponding processes implemented by the mobile terminal/terminal in various methods in the embodiments of the present application, which will not be repeated here again for brevity.

Figure 13:
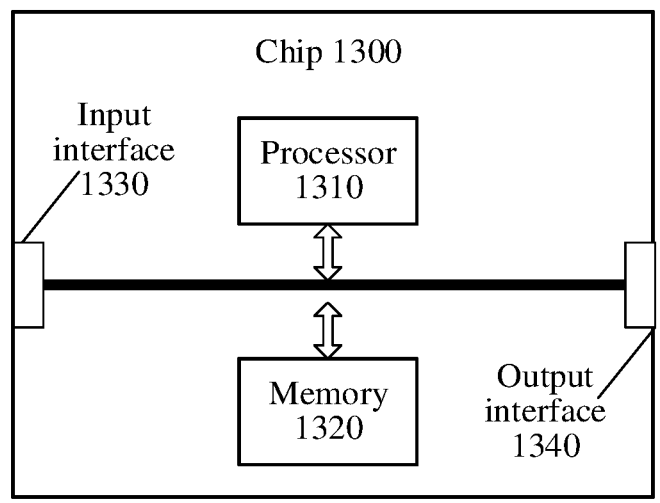
FIG. 13 is a schematic structural diagram of a chip according to an embodiment of the present application.

FIG. 13 is a schematic structural diagram of a chip according to an embodiment of the present application. The chip 1300 shown in FIG. 13 includes a processor 1310. The processor 1310 may call and run a computer program from a memory to implement the methods in the embodiments of the present application.

Optionally, as shown in FIG. 13, the chip 1300 may further include a memory 1320. Herein, the processor 1310 may call and run a computer program from the memory 1320 to implement the methods in the embodiments of the present application.

Herein, the memory 1320 may be a separate device independent of the processor 1310, or may be integrated in the processor 1310.

Optionally, the chip 1300 may further include an input interface 1330. Herein, the processor 1310 may control the input interface 1330 to communicate with another device or chip. Specifically, information or data sent by another device or chip may be acquired.

Optionally, the chip 1300 may further include an output interface 1340. Herein, the processor 1310 may control the output interface 1340 to communicate with another device or chip. Specifically, information or data may be outputted to another device or chip.

Optionally, the chip may be applied to the network device in the embodiments of the present application, and the chip may implement the corresponding processes implemented by the network device in various methods in the embodiments of the present application, which will not be repeated here again for brevity.

Optionally, the chip may be applied to the mobile terminal/terminal in the embodiments of the present application, and the chip may implement the corresponding processes implemented by the mobile terminal/terminal in various methods in the embodiments of the present application, which will not be repeated here again for brevity.

It should be understood that the chip mentioned in the embodiment of the present application may also be referred to as a system-level chip, a system chip, a chip system, or a system chip-on-chip, etc.

Figure 14:
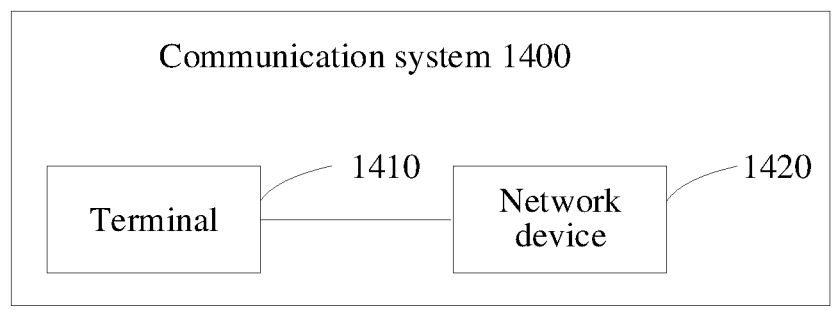
FIG. 14 is a schematic block diagram of a communication system according to an embodiment of the present application.

FIG. 14 is a schematic block diagram of a communication system 1400 according to an embodiment of the present application. As shown in FIG. 14, the communication system 1400 includes a terminal 1410 and a network device 1420.

Herein, the terminal 1410 may be configured to implement the corresponding functions implemented by the terminal in the above methods, and the network device 1420 may be configured to implement the corresponding functions implemented by the network device in the above methods, which will not be repeated here again for brevity.

It should be understood that the processor in the embodiments of the present application may be an integrated circuit chip having a signal processing capability. In an implementation process, each of the acts of the above method embodiments may be completed through an integrated logic circuit of hardware in the processor, or instructions in a form of software. The processor described above may be a general purpose processor, a Digital Signal Processor (DSP), an Application Specific Integrated Circuit (ASIC), a Field Programmable Gate Array (FPGA), or another programmable logic device, a discrete gate or a transistor logic device, or a discrete hardware component. Various methods, acts and logical block diagrams disclosed in the embodiments of the present application may be implemented or performed. The general purpose processor may be a microprocessor, or the processor may also be any conventional processor, or the like. The acts of the methods disclosed in conjunction with the embodiments of the present application may be directly embodied as being executed and completed by a hardware decoding processor, or may be executed and completed by a combination of hardware and software modules in the decoding processor. The software modules may be located in a storage medium which is mature in the art, such as a random access memory, a flash memory, a read-only memory, a programmable read-only memory or an electrically erasable programmable memory, a register, or the like. The storage medium is located in the memory, and the processor reads information in the memory and completes the acts of the above methods in combination with its hardware.

It may be understood that the memory in the embodiments of the present application may be a volatile memory or a non-volatile memory, or may include both a volatile memory and a non-volatile memory. Herein, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through an exemplary but non-restrictive description, many forms of RAMs may be available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), or a Direct Rambus DRAM (DR RAM). It should be noted that the memories in the systems and the methods described herein are intended to include, but are not limited to, these and any other suitable types of memories.

It should be understood that the above memories are described in an exemplary but non-limiting sense. For example, a memory in an embodiment of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is, the memories in the embodiments of the present application are intended to include, but are not limited to, these and any other suitable type of memories.

An embodiment of the present application further provides a computer readable storage medium, configured to store a computer program.

Optionally, the computer readable storage medium may be applied to a network device in an embodiment of the present application, and the computer program causes a computer to perform the corresponding processes implemented by the network device in various methods of the embodiments of the present application, which will not be repeated here again for brevity.

Optionally, the computer readable storage medium may be applied to the mobile terminal/terminal in an embodiment of the present application, and the computer program causes a computer to perform the corresponding processes implemented by the mobile terminal/terminal in various methods of the embodiments of the present application, which will not be repeated here again for brevity.

An embodiment of the present application further provides a computer program product, including computer program instructions.

Optionally, the computer program product may be applied to a network device in an embodiment of the present application, and the computer program instructions cause a computer to perform the corresponding processes implemented by the network device in various methods of the embodiments of the present application, which will not be repeated here again for brevity.

Optionally, the computer program product may be applied to the mobile terminal/terminal in an embodiment of the present application, and the computer program instructions cause a computer to perform the corresponding processes implemented by the mobile terminal/terminal in various methods of the embodiments of the present application, which will not be repeated here again for brevity.

An embodiment of the present application further provides a computer program.

Optionally, the computer program may be applied to a network device in an embodiment of the present application, and when run on a computer, the computer program causes the computer to perform the corresponding processes implemented by the network device in various methods of the embodiments of the present application, which will not be repeated here again for brevity.

Optionally, the computer program may be applied to the mobile terminal/terminal in an embodiment of the present application, and when run on a computer, the computer program causes the computer to perform the corresponding processes implemented by the mobile terminal/terminal in various methods of the embodiments of the present application, which will not be repeated here again for brevity.

Those of ordinary skill in the art may recognize that the exemplary units and algorithm acts described in combination with the embodiments disclosed herein can be implemented in electronic hardware, or a combination of computer software and electronic hardware. Whether these functions are executed in a mode of hardware or software depends on a specific application and design constraint condition of the technical solution. Those skilled in the art may use different methods to implement the described functions for each particular application, but such an implementation should not be considered to be beyond the scope of the present application.

Those skilled in the art may clearly understand that for the sake of convenience and conciseness of description, as to the specific working processes of the systems, apparatuses, and units described above, reference may be made to the corresponding processes in the above method embodiments, which will not be repeated here again.

In the several embodiments provided by the present application, it should be understood that the disclosed systems, apparatuses, and methods may be implemented in another mode. For example, the apparatus embodiments described above are only illustrative, for example, the division of the units is only a logical function division, and there may be another division mode in an actual implementation. For example, multiple units or components may be combined or integrated into another system, or some features may be ignored, or not executed. On the other hand, mutual coupling or direct coupling or a communication connection shown or discussed may be indirect coupling or the communication connection through some interfaces, apparatuses, or units, which may be in electrical, mechanical, or in another form.

A unit described as a separate component may or may not be physically separated, and the component shown as a unit may or may not be a physical unit, i.e., it may be located in one place, or may be distributed across multiple network units. Part or all of the units herein may be selected according to an actual need to achieve the purpose of the solutions of the embodiments.

In addition, various functional units in various embodiments of the present application may be integrated into one processing unit, or it may be that the various units exist physically separately, or two or more units may be integrated into one unit.

The function, if achieved in a form of software functional units, and sold or used as a separate product, may be stored in one computer readable storage medium. Based on such understanding, the technical solution of the present application, in essence, or the part contributing to the prior art, or the part of the technical solution, may be embodied in the form of a software product stored in one storage medium, including a number of instructions for causing one computer device (which may be a personal computer, a server, or a network device, etc.) to perform all or part of the acts of the methods described in various embodiments of the present application. And the foregoing storage medium includes: various media that may store program codes, such as a USB flash disk, a mobile hard disk, a Read-only Memory (ROM), a Random Access Memory (RAM), a magnetic disk, or an optical disk, etc.

What are described above are merely specific implementations of the present application, but the protection scope of the present application is not limited thereto. Any variation or substitution that may be easily conceived by a person familiar with the art within the technical scope disclosed by the present application shall be included within the protection scope of the present application. Therefore, the protection scope of the present application shall be subject to the protection scope of the claims.

The invention claimed is:

1. A method for random access, comprising:
in a case that a terminal determines fallback to a four-step random access procedure to retransmit a physical uplink shared channel (PUSCH) in a MSG A in a two-step random access procedure, completing preparation for retransmitting the PUSCH within a third time interval after a physical downlink shared channel (PDSCH), the MSG A comprising a physical random access channel (PRACH) and the PUSCH,
wherein the PDSCH is used for carrying a MSG B in the two-step random access procedure, and the MSG B in the two-step random access procedure is a response message to the MSG-A;
wherein the third time interval comprises first time, the first time being preparation time of the terminal for the PUSCH; wherein a duration of the first time is $N_2$ symbols, and $N_2$ is related to the terminal's processing capability related to the preparation time for the PUSCH;
the third time interval further comprises second time, the second time being processing time of the terminal for the PDSCH, wherein a duration of the second time is $N_1$ symbols, and $N_1$ is related to the terminal's processing capability related to the preparation time for the PDSCH; wherein the third time interval further comprises a second fixed time length.

2. The method according to claim 1, wherein the second fixed time length is 0.5 ms.

3. The method according to claim 1, wherein the completing preparation for retransmitting the PUSCH within a third time interval after a PDSCH comprises:

completing, by the terminal, preparation for retransmitting the PUSCH within the third time interval after a last symbol of the PDSCH.

4. The method according to claim 1, further comprising:
detecting, by the terminal, first DCI within a first time window, the first DCI being used for scheduling the PDSCH, the PDSCH comprising first indication information, and the first indication information being used for indicating that a base station successfully receives the PRACH and does not successfully receive the PUSCH; and
determining, by the terminal based on the first indication information, to retransmit the PUSCH in the MSG-A;
wherein the first time window is a window for receiving the MSG B.

5. A method for random access, comprising:
transmitting, by a network device, a MSG-B in the two-step random access procedure to a terminal through a physical downlink shared channel (PDSCH), wherein the MSG-B is a response message to a MSG-A in a two-step random access procedure, and the MSG-A comprises a physical random access channel (PRACH) and a physical downlink shared channel (PDSCH); and
receiving, by the network device, the PUSCH retransmitted by the terminal in a case that determines fallback to a four-step random access procedure, wherein preparation for retransmitting the PUSCH is completed within a third time interval after the PDSCH;
wherein the third time interval comprises first time, the first time being preparation time of the terminal for the PUSCH; wherein a duration of the first time is $N_2$ symbols, and $N_2$ is related to the terminal's processing capability related to the preparation time for the PUSCH;
the third time interval further comprises second time, the second time being processing time of the terminal for the PDSCH; wherein a duration of the second time is $N_1$ symbols, and $N_1$ is related to the terminal's processing capability related to the preparation time for the PDSCH; wherein the third time interval further comprises a second fixed time length.

6. The method according to claim 5, wherein the second fixed time length is 0.5 ms.

7. The method according to claim 5, wherein the preparation for retransmitting the PUSCH is completed within the third time interval after a last symbol of the PDSCH.

8. The method according to claim 5, further comprising:
transmitting, by the network device, first DCI within a first time window, the first DCI being used for scheduling the PDSCH, the PDSCH comprising first indication information, and the first indication information being used for indicating that the network device successfully receives the PRACH and does not successfully receive the PDSCH;
wherein the first time window is a window for transmitting the MSG B.

9. A network device, comprising: a processor and a memory, wherein the memory is configured to store a computer program, and the processor is configured to call and run the computer program stored in the memory to execute the method according to claim 5.

10. The network device according to claim 9, wherein the preparation for retransmitting the PUSCH is completed within the third time interval after a last symbol of the PDSCH.

11. The network device according to claim 9, wherein the processor is further configured to execute a following step when calling and running the computer program stored in the memory:
transmitting, through a transceiver, first DCI within a first time window, the first DCI being used for scheduling the PDSCH, the PDSCH comprising first indication information, and the first indication information being used for indicating that the network device successfully receives the PRACH and does not successfully receive the PUSCH;
wherein the first time window is a window for transmitting the MSG B.

12. An apparatus for random access, comprising:
a processor, configured to complete preparation for retransmitting a physical uplink shared channel (PUSCH) within a third time interval after a physical downlink shared channel (PDSCH), in a case of determining fallback to a four-step random access procedure to retransmit the PUSCH in a MSG A in a two-step random access procedure, the MSG-A comprising a physical random access channel (PRACH) and the PUSCH,
wherein the PDSCH is used for carrying a MSG B in the two-step random access procedure, and the MSG-B is a response message to the MSG-A;
wherein the third time interval comprises first time, the first time being preparation time of the terminal for the PUSCH; wherein a duration of the first time is $N_2$ symbols, and $N_2$ is related to the terminal's processing capability related to the preparation time for the PUSCH;
the third time interval further comprises second time, the second time being processing time of the terminal for the PDSCH; wherein a duration of the second time is $N_1$ symbols, and $N_1$ is related to the terminal's processing capability related to the preparation time for the PDSCH; wherein the third time interval further comprises a second fixed time length.

13. The apparatus according to claim 12, wherein the second fixed time length is 0.5 ms.

14. The apparatus according to claim 12, wherein the processor is configured to complete preparation for retransmitting the PUSCH within the third time interval after a last symbol of the PDSCH.

15. The apparatus according to claim 12, wherein the processor is further configured to:
detect first DCI within a first time window, wherein the first DCI is used for scheduling the PUSCH, the PDSCH comprises first indication information, and the first indication information is used for indicating that a base station successfully receives the PRACH and does not successfully receive the PUSCH; and
determine, based on the first indication information, to retransmit the PUSCH in the MSG-A;
wherein the first time window is a window for receiving the MSG B.

* * * * *

UNITED STATES PATENT AND TRADEMARK OFFICE
CERTIFICATE OF CORRECTION

PATENT NO. : 12,250,733 B2  
APPLICATION NO. : 17/578261  
DATED : March 11, 2025  
INVENTOR(S) : Chuanfeng He Page 1 of 1

It is certified that error appears in the above-identified patent and that said Letters Patent is hereby corrected as shown below:

In the Claims

In Column 22, Claim 1, Line 60: delete "preparation" and insert -- processing --

In Column 22, Claim 3, Lines 66-67: delete "a third time interval after a PDSCH" and insert -- the third time interval after the PDSCH --

In Column 23, Claim 5, Lines 17-18: delete "the two-step" and insert -- a two-step --

In Column 23, Claim 5, Lines 20-21: delete "MSG-A in a" and insert -- MSG-A in the --

In Column 23, Claim 5, Line 23-24: delete "downlink shared channel (PDSCH);" and insert -- uplink shared channel (PUSCH); --

In Column 23, Claim 5, Line 26: delete "that determines" and insert -- that the terminal determines --

In Column 23, Claim 5, Line 40: delete "preparation" and insert -- processing --

In Column 23, Claim 8, Line 55: delete "PDSCH" and insert -- PUSCH --

In Column 24, Claim 12, Line 41: delete "preparation" and insert -- processing --

In Column 24, Claim 15, Line 53: delete "PUSCH" and insert -- PDSCH --

Signed and Sealed this  
Twenty-ninth Day of April, 2025

Coke Morgan Stewart  
*Acting Director of the United States Patent and Trademark Office*